US012008372B2

(12) United States Patent
Jacobs et al.

(10) Patent No.: US 12,008,372 B2
(45) Date of Patent: Jun. 11, 2024

(54) TECHNIQUES FOR REDUCING CPU PRIVILEGE BOUNDARY CROSSINGS

(71) Applicant: VMware LLC, Palo Alto, CA (US)

(72) Inventors: Frederick Joseph Jacobs, Los Gatos, CA (US); Sam Scalise, San Jose, CA (US); Martim Carbone, Sunnyvale, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/870,651

(22) Filed: Jul. 21, 2022

(65) Prior Publication Data

US 2024/0028336 A1    Jan. 25, 2024

(51) Int. Cl.
*G06F 9/30* (2018.01)
*G06F 9/455* (2018.01)
*G06F 9/54* (2006.01)

(52) U.S. Cl.
CPC ...... *G06F 9/30145* (2013.01); *G06F 9/45533* (2013.01); *G06F 9/545* (2013.01)

(58) Field of Classification Search
None
See application file for complete search history.

(56) References Cited

U.S. PATENT DOCUMENTS

| | | | | |
|---|---|---|---|---|
| 5,515,538 A | * | 5/1996 | Kleiman | G06F 9/52 718/103 |
| 6,622,300 B1 | * | 9/2003 | Krishnaswamy | G06F 9/45525 717/130 |
| 7,478,373 B2 | * | 1/2009 | Bond | G06F 9/45504 717/125 |
| 7,895,407 B2 | * | 2/2011 | Dankel | G06F 12/109 711/170 |
| 7,996,629 B2 | * | 8/2011 | Wan | G06F 12/109 711/147 |
| 8,146,106 B2 | * | 3/2012 | Kim | G06F 9/30145 717/136 |
| 8,230,181 B2 | * | 7/2012 | Wan | G06F 12/109 711/147 |

(Continued)

FOREIGN PATENT DOCUMENTS

| | | | | |
|---|---|---|---|---|
| GB | 2514881 A | * | 12/2014 | ........... G06F 21/126 |
| WO | WO-2013134206 A1 | * | 9/2013 | ............. G06F 21/55 |

OTHER PUBLICATIONS

Ole Agesen et al., "Software Techniques for Avoiding Hardware Virtualization Exits", USENIX, Jun. 13, 2012.

*Primary Examiner* — Steven G Snyder
(74) *Attorney, Agent, or Firm* — Quarles & Brady LLP

(57) ABSTRACT

In one set of embodiments, an operating system (OS) kernel of a computer system can receive an invocation of a system call by a user program running on the computer system. The OS kernel can further fetch a plurality of subsequent instructions that will be executed by the user program after the invocation of the system call and decode the plurality of subsequent instructions into a plurality of decoded instructions. The OS kernel can then analyze whether the plurality of decoded instructions include an additional system call invocation and whether other decoded instructions that appear between the invocation of the system call and the additional system call invocation are viable for emulation by the OS kernel.

21 Claims, 5 Drawing Sheets

(56) References Cited

U.S. PATENT DOCUMENTS

| | | | | |
|---|---|---|---|---|
| 8,484,616 | B1* | 7/2013 | McCann | G06F 8/20 |
| | | | | 717/106 |
| 8,555,386 | B1* | 10/2013 | Belov | G06F 21/566 |
| | | | | 726/22 |
| 9,372,695 | B2* | 6/2016 | Gschwind | G06F 8/433 |
| 9,456,071 | B2* | 9/2016 | Tofighbakhsh | H04W 24/02 |
| 9,832,669 | B2* | 11/2017 | Tofighbakhsh | G06F 21/6281 |
| 10,318,322 | B2* | 6/2019 | Bugnion | G06F 9/3005 |
| 11,409,572 | B2* | 8/2022 | Opferman | G06F 9/4806 |
| 2003/0033507 | A1* | 2/2003 | McGrath | G06F 9/30192 |
| | | | | 712/225 |
| 2008/0140971 | A1* | 6/2008 | Dankel | G06F 12/109 |
| | | | | 711/E12.001 |
| 2009/0006074 | A1* | 1/2009 | Green | G06F 9/45504 |
| | | | | 703/28 |
| 2009/0172713 | A1* | 7/2009 | Kim | G06F 9/30145 |
| | | | | 712/E9.06 |
| 2009/0210649 | A1* | 8/2009 | Wan | G06F 9/30087 |
| | | | | 711/170 |
| 2011/0264867 | A1* | 10/2011 | Wan | G06F 12/109 |
| | | | | 711/147 |
| 2015/0134809 | A1* | 5/2015 | Tofighbakhsh | H04L 69/321 |
| | | | | 709/224 |
| 2016/0162292 | A1* | 6/2016 | Bugnion | G06F 9/3005 |
| | | | | 712/245 |
| 2016/0381575 | A1* | 12/2016 | Tofighbakhsh | H04W 28/0289 |
| | | | | 709/224 |
| 2020/0019406 | A1* | 1/2020 | Kalamatianos | G06F 9/30145 |
| 2021/0096908 | A1* | 4/2021 | Opferman | G06F 9/30098 |

* cited by examiner

TECHNIQUES FOR REDUCING CPU PRIVILEGE BOUNDARY CROSSINGS

BACKGROUND

Unless otherwise indicated, the subject matter described in this section is not prior art to the claims of the present application and is not admitted as being prior art by inclusion in this section.

On modern computer systems, software programs typically run in one of two central processing unit (CPU) execution modes: kernel mode and user mode. Kernel mode is the most privileged CPU execution mode and allows program code running in this mode to have complete access to system resources. Accordingly, kernel mode is generally reserved for executing the lowest level functions of an operating system (OS), collectively known as the OS kernel.

User mode is a less privileged CPU execution mode that restricts the ability of program code running in this mode to directly access many system resources. As a result, such program code must invoke certain application programing interfaces (APIs), known as system calls, to ask the OS kernel (which runs in kernel mode) to access those system resources on its behalf. Most software programs, including applications and higher level portions of the OS, run in user mode. These programs are referred to herein as user programs.

At the time a user program invokes a system call, the CPU on which that user program runs will transition (or in other words, switch) from user mode to kernel mode and transfer control to the OS kernel, thereby enabling the OS kernel to process (i.e., handle) the system call. Upon completion of this system call handling, the CPU will switch back to user mode so that the user program can resume its execution. For various reasons, each transition from user mode to kernel mode and vice versa incurs a significant time cost. Thus, a reduction in the number of these switches may materially improve the performance of the user program.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

Embodiments of the present disclosure are directed to techniques that can be implemented in an OS kernel for reducing the number of transitions between user mode and kernel mode that are necessitated by system calls invoked by a user program. Because user mode and kernel mode are associated with different CPU privilege levels, these user mode-to-kernel mode and kernel mode-to-user mode transitions are referred to herein as CPU privilege boundary crossings.

1. Example Computer System and Solution Overview

Figure 1:
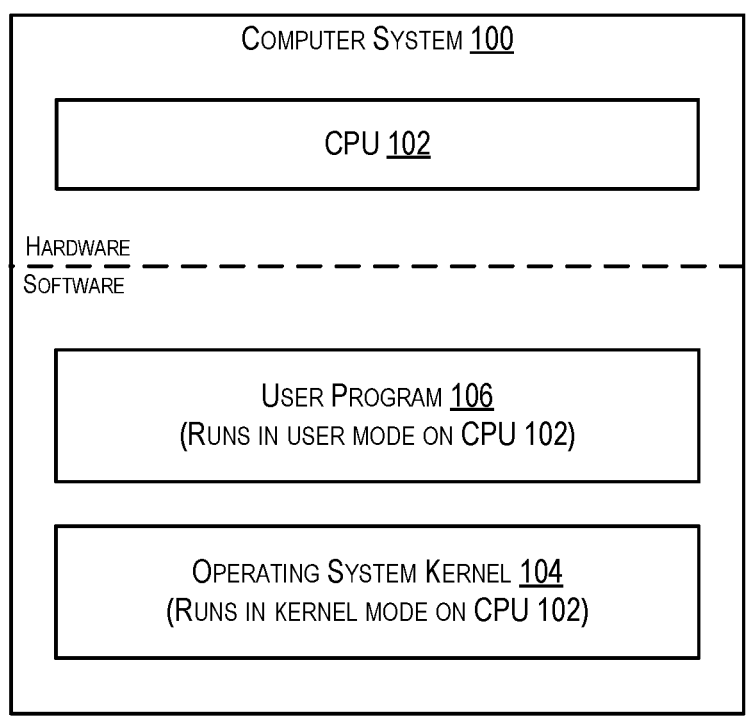
FIG. 1 depicts an example computer system.

FIG. 1 is a simplified block diagram of an example computer system 100 in which the techniques of the present disclosure may be implemented. As shown, computer system 100 includes a CPU 102 in hardware and an OS kernel 104 and a user program 106 in software. OS kernel 104, which is configured to perform the core functions of an OS running on computer system 100, runs in kernel mode on CPU 102. This means that OS kernel 104 has unrestricted access to the resources of computer system 102 (e.g., CPU instructions and registers, system memory, file input/output (I/O), etc.).

In contrast, user program 106, which may be an application or a user-level portion of the OS, is configured to run in user mode on CPU 102. This means that user program 106 is limited in terms of the types of system resources it can access on its own. The restrictive nature of user mode provides a measure of isolation between user program 106 and the rest of computer system 100, thereby protecting the system from potentially malicious user-level code.

In scenarios where user program 106 wishes to execute a privileged operation that is disallowed in user mode but allowed in kernel mode, the user program can ask OS kernel 104 to perform the operation on its behalf via a system call mechanism. Examples of such privileged operations include reading or writing a file, accessing system memory, and so on. The general workflow for this system call mechanism is depicted as workflow 200 in FIG. 2.

Starting with step 202, user program 106 invokes a system call for a privileged operation and provides appropriate input parameters with the invocation. In response, a user-level system call stub function generates an interrupt (also known as a trap) directed to a system call interrupt handler in OS kernel 104 (step 204). This interrupt is detected by CPU 102 and causes the CPU to save its current state (e.g., program counter of user program 106 and processor status), switch from user mode to kernel mode, and transfer control to the OS kernel's system call interrupt handler (step 206).

At step 208, the system call interrupt handler identifies, via information passed from the user-level stub function, the specific system call being invoked and calls a kernel-level function corresponding to that system call. The kernel-level function then validates the input parameters provided with the system call invocation and, if the validation is successful, executes the system call and returns control to the system call interrupt handler upon completion (with a return value if appropriate) (step 210).

At step 212, if the kernel-level function provided a return value, the system call interrupt handler copies the return value in a CPU register accessible by user program 106. Finally, the system call interrupt handler invokes a CPU interrupt return instruction (step 214), which causes CPU 102 to switch from kernel mode to user mode, restore the CPU state saved at step 206, and transfer control back to user program 106 at the next instruction after the original system call invocation (step 216), thereby enabling user program 106 to resume execution (step 218).

As noted in the Background section, transitioning from user mode to kernel mode in response to a system call invocation, as well as transitioning from kernel mode to user mode once the system call has been executed, incurs a relatively high time cost. This time cost stems from various factors such as the latency of the switching mechanisms in hardware, the copying of input data (i.e., input parameters) for the system call, input parameter validation, the copying of output data (i.e., return value) generated by the system call, and so on. Accordingly, these CPU privilege boundary crossings can noticeably degrade the performance of user program 106, particularly if the crossings occur frequently or accrue to latency-sensitive portions of the program.

Figure 3:
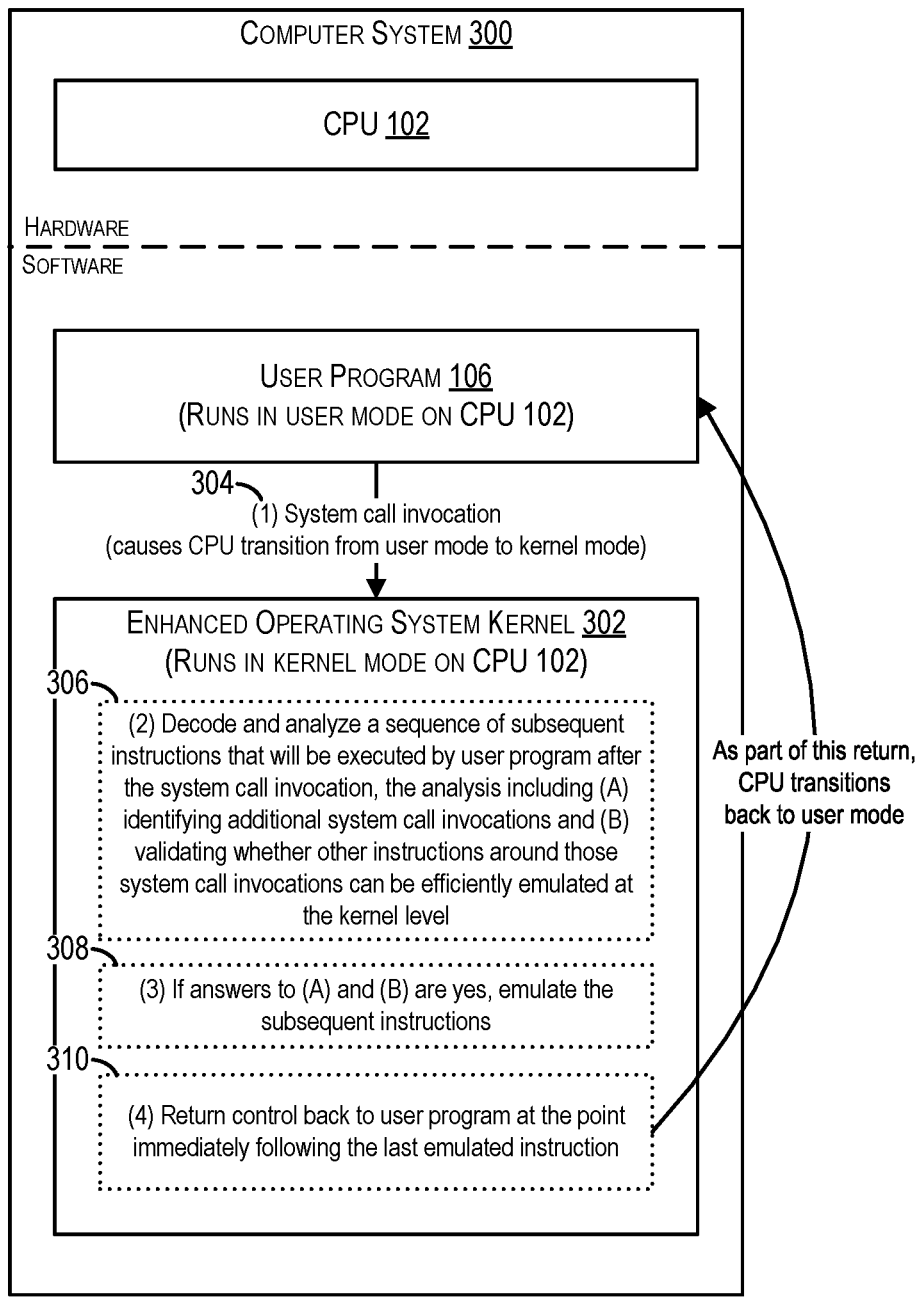
FIG. 3 depicts a modified version of the computer system of FIG. 1 comprising an enhanced OS kernel for reducing CPU privilege boundary crossings according to certain embodiments.

To address the foregoing, FIG. 3 depicts a modified version of computer system 100, shown via reference numeral 300, that includes an enhanced OS kernel 302 in accordance with certain embodiments. At a high level, when user program 106 invokes a system call that causes CPU 102 to transition from user mode to kernel mode (step (1); reference numeral 304), enhanced OS kernel 302 can decode and analyze a sequence of subsequent instructions that will be executed by user program 106 immediately after the system call invocation (step (2); reference numeral 306). As part of this analysis, enhanced OS kernel 302 can determine (A) whether user program 106 will perform additional system call invocations within that sequence of subsequent instructions (and thus, in the near future), and (B) whether the instructions surrounding any such additional system call invocations can be efficiently emulated at the kernel level.

If the answers to both (A) and (B) are yes, enhanced OS kernel 302 can proceed with emulating the instructions, including the additional system call invocations included therein (step (3); reference numeral 308), and return control back to user program 106 once that is done (step (4); reference numeral 310). In particular, enhanced OS kernel can return control back to user program 106 at the point in its instruction stream immediately following the last instruction executed/emulated by kernel 302. User program 106 can then continue its operation from that point onward.

With this general approach, enhanced OS kernel 302 can substantially reduce the number of CPU privilege boundary crossings necessitated by the system calls invoked by user program 106, resulting in improved program performance. This is because any system call invocations that are clustered together (or in other words, occur in close proximity) within the program's instruction stream will be executed by enhanced OS kernel 302 in the context of a single pair of transitions into and out of kernel mode, as long as the instructions between those system call invocations can be efficiently emulated. Such clustering of system calls is relatively common in applications due to repetitive control flows such as loops, recursion, and the like.

For example, assume user program 106 includes a loop in which the program writes to n different data blocks of a file, resulting in n "file write" system calls C1, C2, C3, . . . Cn in close succession. In this scenario, once CPU 102 has switched from user mode to kernel mode and transferred control to enhanced OS kernel 302 in response to the first system call C1, enhanced OS kernel 302 can advantageously identify and execute the remaining system calls C2, C3, . . . Cn (and emulate any intervening instructions) in kernel mode before returning to user program 106, thereby requiring only a single roundtrip between user mode and kernel mode. This is in contrast to conventional OS kernels, which will immediately return to user program 106 upon executing each individual system call Ci and thus require n separate roundtrips between user mode and kernel mode.

Figure 2:
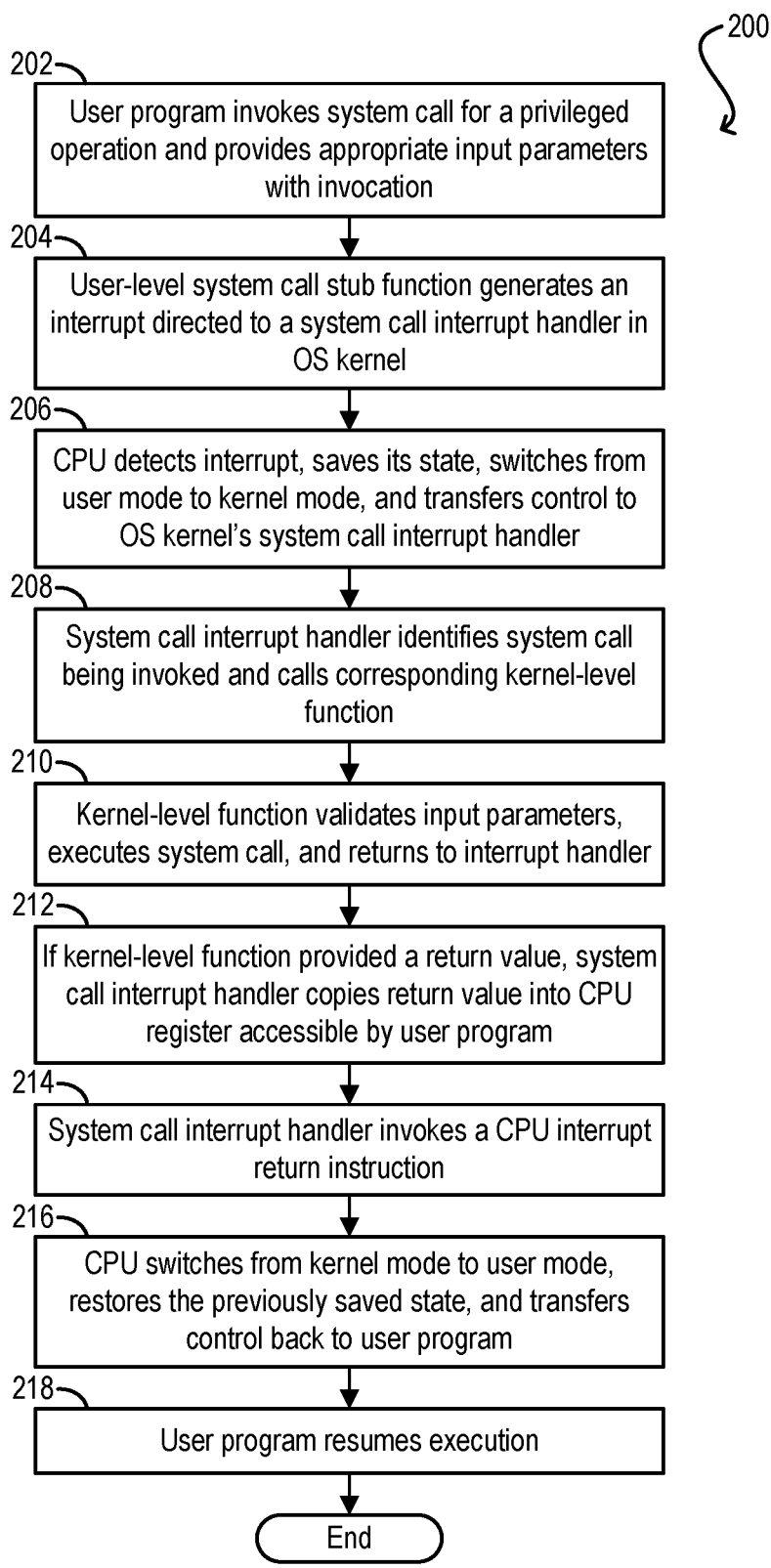
FIG. 2 depicts a system call handling workflow.

The remaining sections of this disclosure provide additional details for implementing enhanced OS kernel 302 with respect to the functionality shown in FIG. 3 according to various embodiments, as well as certain optimizations that can accelerate the kernel's emulation of user program instructions. It should be appreciated that FIGS. 1-3 are illustrative and not intended to limit embodiments of the present disclosure. For example, although FIG. 3 depicts a particular series of steps performed by enhanced OS kernel 302, the ordering of these steps may be modified, some steps may be split into multiple steps, some steps may be omitted or combined, etc. In addition, computer system 300 may include components or subcomponents that are not specifically described. One of ordinary skill in the art will recognize other variations, modifications, and alternatives.

2. Example OS Kernel Implementation

Figure 4:
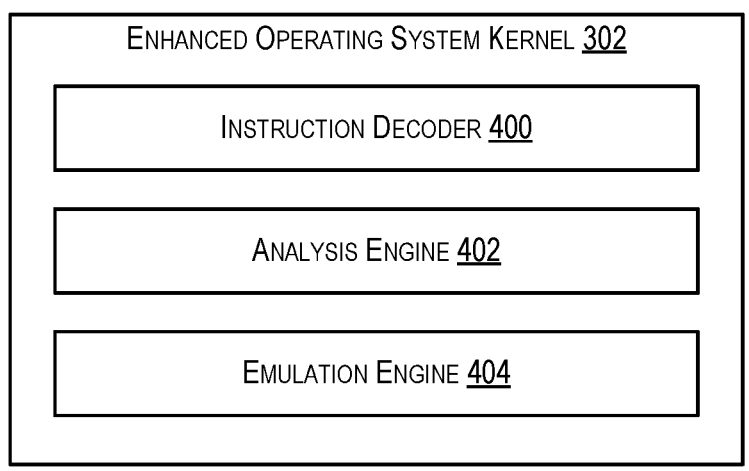
FIG. 4 depicts an example architecture for the enhanced OS kernel of FIG. 3 according to certain embodiments.
Figure 5:
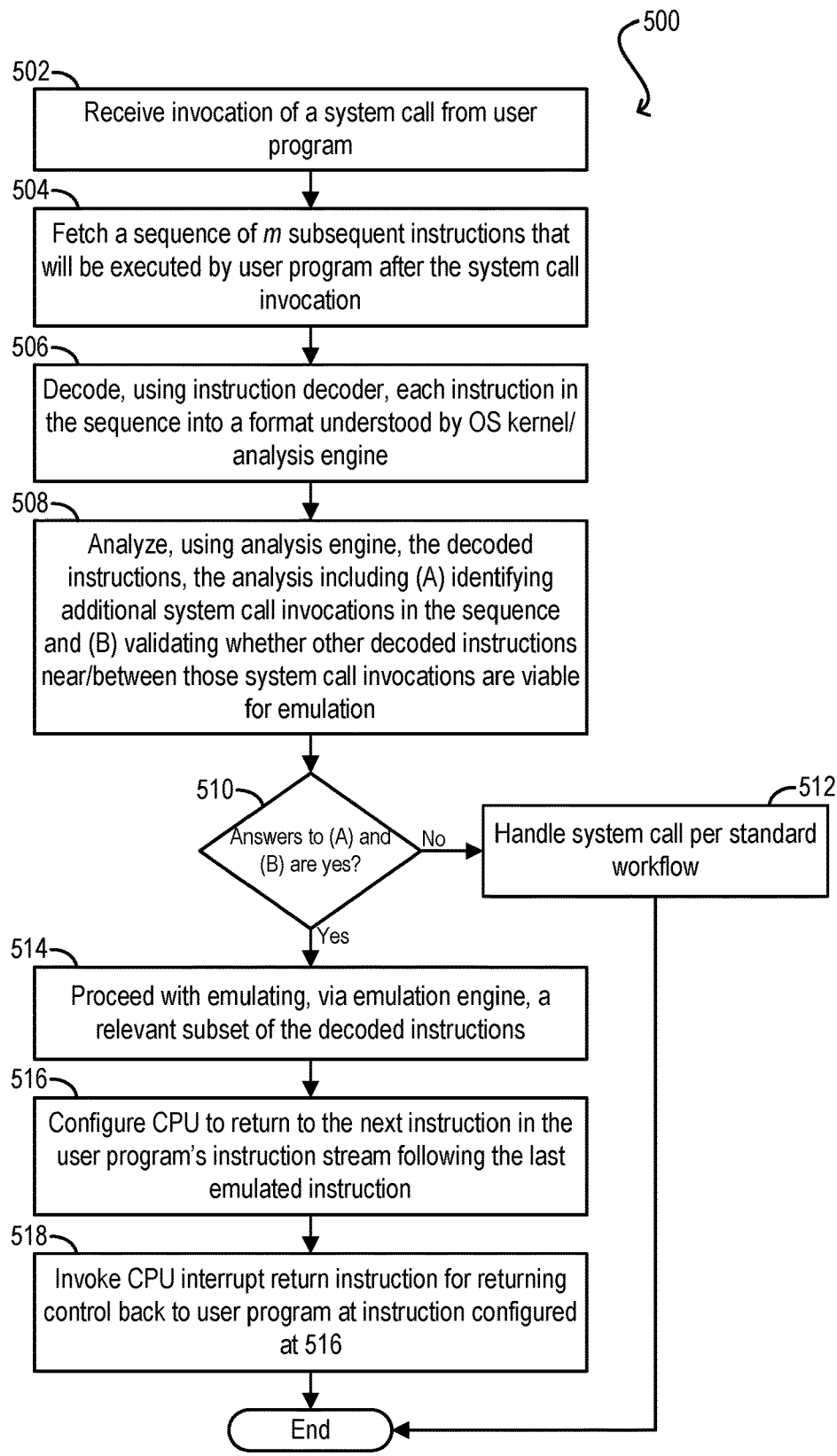
FIG. 5 depicts a system call handling workflow that may be executed by the enhanced OS kernel of FIG. 3 using the architecture of FIG. 4 according to certain embodiments.

FIG. 4 depicts an example architecture for enhanced OS kernel 302 of FIG. 3 and FIG. 5 depicts a workflow 500 that can be executed by the OS kernel using this architecture to reduce CPU privilege boundary crossings with respect to system calls invoked by user program 106 according to certain embodiments.

As shown in FIG. 4, enhanced OS kernel 302 includes, among other things, an instruction decoder 400, an analysis engine 402, and an emulation engine 404. Generally speaking, instruction decoder 400 can decode (i.e., translate) instructions in the instruction stream of user program 106 into a format understandable by enhanced OS kernel 302 and analysis engine 402. Analysis engine 402 can identify system call invocations in a sequence of user program instructions decoded via instruction decoder 400 and can determine whether intervening instructions found near/between the identified system call invocations are viable for emulation by enhanced OS kernel 302, either individually or as a group. And emulation engine 404 can emulate, in kernel mode, the user program instructions decoded via instruction decoder 400, thereby causing the state of CPU 102/computer system 400 to change as if those instructions were executed by user program 106 itself in user mode.

Turning now to workflow 500, starting with steps 502 and 504, enhanced OS kernel 302 can receive an invocation of a system call by user program 106 and can fetch a sequence of m subsequent instructions that will be executed by user program 106 upon completion of the system call. Enhanced OS kernel 302 can perform the fetching at step 504 because CPU 102 will have saved the current program counter—which is the address of the next instruction to be executed—for user program 106 at the time of transitioning from user mode to kernel mode in response to the system call invocation. Accordingly, enhanced OS kernel 302 can obtain the saved program counter value and retrieve, from cache or system memory, the next m instructions in the instruction stream for user program 106 starting from that program counter address. The value m may be statically configured or dynamically set based on runtime factors such as the current execution state of user program 106.

At step 506, enhanced OS kernel 302 can decode, using instruction decoder 400, each user program instruction fetched at step 504 into a format understood by kernel 302/analysis engine 402. In one set of embodiments, this decoding process can involve translating the user program instruction, which is essentially a sequence of bits, into an operation code and one or more operands. For example, the operation code may be a register move operation and the operands may identify source and destination register addresses.

Enhanced OS kernel 302 can then analyze, using analysis engine 402, the user program instructions decoded via instruction decoder 400 to determine whether it should simply execute the invoked system call and return to user program 106 per conventional operation, or emulate some (or all) of the decoded instructions to eliminate one or more CPU privilege boundary crossings (step 508). As mentioned previously, this analysis can include (A) identifying additional system call invocations (of either the same or different system calls) in the decoded instructions, and (B) validating whether other decoded instructions near or between those system call invocations can be efficiently emulated (or in other words, are "viable" for emulation) in the OS kernel. For example, assume that the original system call invocation received at step 502 is for system call SYSCALL1 and, as part of (A), analysis engine 402 identifies invocations of two additional system call SYSCALL2 and SYSCALL3 in the decoded instruction set. In this scenario, analysis engine 402 can validate whether other instructions that appear in the decoded instruction set (and thus will be executed by user program 106) between SYSCALL1 and SYSCALL2 and between SYSCALL2 and SYSCALL3 are viable for emulation.

Although an exhaustive discussion of (B) is beyond the scope of the present disclosure, the general idea is that enhanced OS kernel 302 can identify a given instruction or group of instructions as viable for emulation if those instruction(s) are known to be easy to emulate (e.g., math instructions, register and memory move instructions, etc.) and/or can be emulated within a certain time budget that is less than the time cost of performing roundtrips between user mode and kernel mode for the additional system call invocations identified at (A). In this way, enhanced OS kernel 302 can avoid emulating instruction(s) that incur a high emulation cost and thus have the potential to negate the main purpose of the emulation, which is to improve user program performance.

If enhanced OS kernel 302 does not identify any additional system call invocations or determines that one or more decoded instructions are not viable for emulation (i.e., the answers to (A) and/or (B) are no) (step 510), enhanced OS kernel 302 can handle the system call in accordance with standard workflow 200 of FIG. 2 (step 512).

However, if enhanced OS kernel 302 does identify one or more additional system call invocations and validates that all decoded instructions near/around those additional system call invocations are viable for emulation (i.e., the answers to (A) and/or (B) are yes), enhanced OS kernel 302 can proceed with emulating a relevant subset of the decoded instructions via emulation engine 404 (step 514). The specific instructions that are emulated at this step will depend on how many additional system call invocations are found and where they are located in the instruction stream, but generally speaking enhanced OS kernel 302 will emulate the minimal number of instructions needed to eliminate all CPU privilege boundary crossings.

In one set of embodiments, the emulation performed at step 514 can comprise translating each decoded instruction into an equivalent kernel instruction and executing the kernel instruction on CPU 102, such that CPU 102/computer system 400 is placed into a state which is identical to the state it would be in if those same instructions were executed by user program 106 in user mode. For instructions that correspond to system call invocations, enhanced OS kernel 302 can execute the system calls by invoking their corresponding kernel-level functions and placing any return values in appropriate CPU registers per steps 210 and 212 of workflow 200.

Further, in scenarios where an exceptional event occurs during the emulation (e.g., an error, an upcall event, etc.), enhanced OS kernel 302 can ensure that any emulation steps performed beyond the exceptional event are rolled back and user program 106 is appropriately notified.

Once the emulation is complete, enhanced OS kernel 302 can configure CPU 102 to return to the next instruction in user program 106's instruction stream that follows the last instruction emulated by the kernel (step 516). This last instruction will typically be the last additional system call invocation identified in the decoded instruction set at step 508. Finally, at step 518, enhanced OS kernel 302 can invoke a CPU interrupt return instruction or some other some other similar interrupt return mechanism, thereby causing CPU 102 to switch from kernel mode to user mode and transfer control back to user program 106 at the instruction configured at step 516.

3. Optimizations

In certain embodiments, rather than translating each decoded instruction individually at step 512 of workflow 500, enhanced OS kernel 302 can translate, via emulation engine 404, the instruction subset as a whole into an optimized stream of kernel instructions and can execute that optimized kernel instruction stream on CPU 102 to carry out the emulation. This can make the emulation more efficient because there are often ways in which multiple user program instructions can be collapsed into fewer kernel instructions or otherwise rearranged to reduce execution time while achieving the same outcome.

Further, in certain embodiments enhanced OS kernel 302 can implement caching systems for, e.g., caching the user program instructions decoded at step 506 and/or caching the translated kernel instructions generated as part of the emulation process at step 512. Caching of the decoded user program instructions enables enhanced OS kernel 302 to skip the decoding step for instructions that are seen again by the kernel. Caching of the translated kernel instructions enables enhanced OS kernel 302 to skip both the decoding and analysis steps and directly execute those instructions.

For example, assume enhanced OS kernel 302 fetches the user program instruction sequence [I1, I2, I3], decodes this into [I1_decoded, I2_decoded, I3_decoded], analyzes these decoded instructions and determines they should be emulated, translates the decoded instructions into kernel instructions [I1_kernel, I2_kernel, I3_kernel], and finally executes the kernel instructions on CPU 102 and caches them for future use. In this scenario, if enhanced OS kernel 302 fetches user program instruction sequence [I1, I2, I3] again in response to, e.g., a later invocation of the same system call, the kernel can simply retrieve the translated kernel instructions corresponding to the sequence (i.e., [I1_kernel, I2_kernel, I3_kernel]) from the cache and execute them, because the sequence has already been decoded and validated as being viable for emulation.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
   receiving, by an operating system (OS) kernel of a computer system, an invocation of a system call by a user program running on the computer system;
   fetching, by the OS kernel, a plurality of subsequent instructions that will be executed by the user program after the invocation of the system call;
   decoding, by the OS kernel, the plurality of subsequent instructions into a plurality of decoded instructions; and
   analyzing, by the OS kernel, whether:
      the plurality of decoded instructions includes an additional system call invocation; and
      all other decoded instructions that appear in the plurality of decoded instructions between the invocation of the system call and the additional system call invocation are viable for emulation by the OS kernel.

2. The method of claim 1 further comprising, if the plurality of decoded instructions includes the additional system call invocation and the other decoded instructions are viable for emulation by the OS kernel:
   emulating, by the OS kernel, the other decoded instructions;
   executing, by the OS kernel, the additional system call invocation; and
   returning control to the user program at a next instruction in an instruction stream of the user program that follows the additional system call invocation.

3. The method of claim 1 further comprising, if the plurality of decoded instructions does not include the additional system call invocation or the other decoded instructions are not viable for emulation by the OS kernel:
   executing, by the OS kernel, the system call; and
   returning control to the user program at a next instruction in an instruction stream of the user program that follows the invocation of the system call.

4. The method of claim 2 wherein the OS kernel runs in a kernel mode of a central processing unit (CPU) of the computer system, wherein the user program runs in a user mode of the CPU, and wherein the emulating of the other decoded instructions eliminates CPU privilege boundary crossings caused by the additional system call invocation.

5. The method of claim 2 wherein the emulating comprises:
   translating the other decoded instructions into a stream of kernel instructions; and
   executing the stream of kernel instructions.

6. The method of claim 5 further comprising:
   caching the stream of kernel instructions; and
   upon fetching the plurality of subsequent instructions again, directly executing the stream of kernel instructions without performing the decoding and the analyzing.

7. The method of claim 1 further comprising:
   caching the plurality of decoded instructions; and
   upon fetching an instruction in the plurality of subsequent instructions again, retrieving a decoded version of the instruction from the cached plurality of decoded instructions.

8. A non-transitory computer readable storage medium having stored thereon program code executable by an operating system (OS) kernel of a computer system, the program code embodying a method comprising:
   receiving an invocation of a system call by a user program running on the computer system;
   fetching a plurality of subsequent instructions that will be executed by the user program after the invocation of the system call;
   decoding the plurality of subsequent instructions into a plurality of decoded instructions; and
   analyzing whether:
      the plurality of decoded instructions includes an additional system call invocation; and
      all other decoded instructions that appear in the plurality of decoded instructions between the invocation of the system call and the additional system call invocation are viable for emulation by the OS kernel.

9. The non-transitory computer readable storage medium of claim 8 wherein the method further comprises, if the plurality of decoded instructions includes the additional system call invocation and the other decoded instructions are viable for emulation by the OS kernel:
- emulating, by the OS kernel, the other decoded instructions;
- executing, by the OS kernel, the additional system call invocation; and
- returning control to the user program at a next instruction in an instruction stream of the user program that follows the additional system call invocation.

10. The non-transitory computer readable storage medium of claim 8 wherein the method further comprises, if the plurality of decoded instructions does not include the additional system call invocation or the other decoded instructions are not viable for emulation by the OS kernel:
- executing the system call; and
- returning control to the user program at a next instruction in an instruction stream of the user program that follows the invocation of the system call.

11. The non-transitory computer readable storage medium of claim 9 wherein the OS kernel runs in a kernel mode of a central processing unit (CPU) of the computer system, wherein the user program runs in a user mode of the CPU, and wherein the emulating of the other decoded instructions eliminates CPU privilege boundary crossings caused by the one or more additional system call invocations.

12. The non-transitory computer readable storage medium of claim 9 wherein the emulating comprises:
- translating the other decoded instructions into a stream of kernel instructions; and
- executing the stream of kernel instructions.

13. The non-transitory computer readable storage medium of claim 12 wherein the method further comprises:
- caching the stream of kernel instructions; and
- upon fetching the plurality of subsequent instructions again, directly executing the stream of kernel instructions without performing the decoding and the analyzing.

14. The non-transitory computer readable storage medium of claim 8 wherein the method further comprises:
- caching the plurality of decoded instructions; and
- upon fetching an instruction in the plurality of subsequent instructions again, retrieving a decoded version of the instruction from the cached plurality of decoded instructions.

15. A computer system comprising:
- a central processing unit (CPU);
- an operating system (OS) kernel; and
- a non-transitory computer readable medium having stored thereon program code that causes the OS kernel to:
  - receive an invocation of a system call by a user program running on the computer system;
  - fetch a plurality of subsequent instructions that will be executed by the user program after the invocation of the system call;
  - decode the plurality of subsequent instructions into a plurality of decoded instructions; and
  - analyze whether:
    - the plurality of decoded instructions includes an additional system call invocation; and
    - all other decoded instructions that appear in the plurality of decoded instructions between the invocation of the system call and the additional system call invocation are viable for emulation by the OS kernel.

16. The computer system of claim 15 wherein the program code further causes the OS kernel to, if the plurality of decoded instructions includes the additional system call invocation and the other decoded instructions are viable for emulation by the OS kernel:
- emulate the other decoded instructions;
- execute the additional system call invocation; and
- return control to the user program at a next instruction in an instruction stream of the user program that follows the additional system call invocation.

17. The computer system of claim 15 wherein the program code further causes the OS kernel to, if the plurality of decoded instructions does not include the additional system call invocation or the other decoded instructions are not viable for emulation by the OS kernel:
- execute the system call; and
- return control to the user program at a next instruction in an instruction stream of the user program that follows the invocation of the system call.

18. The computer system of claim 16 wherein the OS kernel runs in a kernel mode of the CPU, wherein the user program runs in a user mode of the CPU, and wherein the emulating of the other decoded instructions eliminates CPU privilege boundary crossings caused by the one or more additional system call invocations.

19. The computer system of claim 16 wherein the emulating comprises:
- translating the other decoded instructions into a stream of kernel instructions; and
- executing the stream of kernel instructions.

20. The computer system of claim 19 wherein the program code further causes the OS kernel to:
- cache the stream of kernel instructions; and
- upon fetching the plurality of subsequent instructions again, directly execute the stream of kernel instructions without performing the decoding and the analyzing.

21. The computer system of claim 15 wherein the program code further causes the OS kernel to:
- cache the plurality of decoded instructions; and
- upon fetching an instruction in the plurality of subsequent instructions again, retrieve a decoded version of the instruction from the cached plurality of decoded instructions.

* * * * *